(12) United States Patent
Remer

(10) Patent No.: US 12,406,049 B2
(45) Date of Patent: Sep. 2, 2025

(54) DEVICE AND METHOD FOR AUTHENITICATING HARDWARE AND/OR EMBEDDED SOFTWARE

(71) Applicant: Rogério Atem De Carvalho, Campos dos Goytacazes (BR)

(72) Inventor: Ricardo Amaral Remer, Rio de Janeiro (BR)

(73) Assignee: Rogério Atem De Carvalho, Campos dos Goytacazes (BR)

( * ) Notice: Subject to any disclaimer, the term of this patent is extended or adjusted under 35 U.S.C. 154(b) by 116 days.

(21) Appl. No.: 18/261,818

(22) PCT Filed: Jan. 19, 2022

(86) PCT No.: PCT/BR2022/050015
§ 371 (c)(1),
(2) Date: Jul. 17, 2023

(87) PCT Pub. No.: WO2022/155718
PCT Pub. Date: Jul. 28, 2022

(65) Prior Publication Data
US 2024/0296217 A1    Sep. 5, 2024

(30) Foreign Application Priority Data
Jan. 22, 2021    (BR) .................. 102021001278-1

(51) Int. Cl.
*G06F 15/16*    (2006.01)
*G06F 9/54*    (2006.01)
(Continued)

(52) U.S. Cl.
CPC ................... *G06F 21/44* (2013.01)

(58) Field of Classification Search
CPC ............... H04L 43/0852; H04L 69/323; H04L 69/321; H04L 69/28; H04L 43/0858;
(Continued)

(56) References Cited

U.S. PATENT DOCUMENTS 8,108,931 B1 * 1/2012 Witten .................. G06F 21/14
726/25
8,667,265 B1 * 3/2014 Hamlet ................. H04L 9/3278
713/185
(Continued)

FOREIGN PATENT DOCUMENTS

BR    102019021409 A2    4/2021
CN    1447269 A    10/2003
(Continued)

OTHER PUBLICATIONS

WIPO, International Search Report (in a corresponding application), Mar. 23, 2022.

*Primary Examiner* — Hamza N Algibhah
(74) *Attorney, Agent, or Firm* — Laurence P. Colton; Smith Tempel Blaha LLC

(57) ABSTRACT

A device and a method for verifying the authenticity of hardware and its embedded software. The method of the invention includes the steps of: a) obtaining an identified record of each unique hardware and software device; b) subsequently interrogating this same unique hardware and software device to compare said identified record obtained in the interrogation with that previously recorded; and c) identify corruption, tampering and/or intrusion/eavesdropping of the hardware/embedded software set when comparing the records does not result in a match. The device is structured and configured to carry out the method.

8 Claims, 4 Drawing Sheets

(51) Int. Cl.
  *G06F 21/44* (2013.01)
  *H04L 29/06* (2006.01)

(58) Field of Classification Search
  CPC ....... H04J 3/0697; H04J 3/0667; G06F 21/44; G06F 21/73
  USPC .......................................................... 726/19
  See application file for complete search history.

(56) References Cited

U.S. PATENT DOCUMENTS

| | | | | |
|---|---|---|---|---|
| 10,225,255 | B1* | 3/2019 | Jampani | G06F 21/44 |
| 10,749,686 | B2 | 8/2020 | Quach | |
| 11,201,641 | B2* | 12/2021 | Shake | H04B 7/0689 |
| 11,436,340 | B2* | 9/2022 | Freeman | G06N 20/00 |
| 2008/0005798 | A1 | 1/2008 | Ross | |
| 2009/0025073 | A1* | 1/2009 | Beverly | H04L 63/083 726/7 |
| 2011/0267190 | A1* | 11/2011 | Payson | G06F 21/86 340/539.31 |
| 2012/0124385 | A1* | 5/2012 | Klasen | H04L 9/3236 713/179 |
| 2013/0047209 | A1 | 2/2013 | Satoh | |
| 2014/0082720 | A1* | 3/2014 | Markel | G06F 21/44 726/16 |
| 2014/0223554 | A1* | 8/2014 | Roden, III | G06F 21/552 726/22 |
| 2014/0223580 | A1* | 8/2014 | Neivanov | G06F 21/31 726/28 |
| 2014/0277761 | A1* | 9/2014 | Matsuoka | F24F 11/64 700/276 |
| 2014/0289835 | A1 | 9/2014 | Varshavsky | |
| 2014/0365755 | A1 | 12/2014 | Liu | |
| 2015/0227762 | A1* | 8/2015 | Lee | H05K 5/0208 726/34 |
| 2016/0098561 | A1* | 4/2016 | Keller | G06F 21/566 726/24 |
| 2016/0112083 | A1* | 4/2016 | Keller, III | G06F 21/44 375/316 |
| 2016/0124041 | A1* | 5/2016 | Pathak | H01L 23/576 324/629 |
| 2016/0239662 | A1* | 8/2016 | Endoh | G06F 21/12 |
| 2016/0274162 | A1* | 9/2016 | Freeman | A61N 1/39 |
| 2016/0330030 | A1 | 11/2016 | Yi et al. | |
| 2017/0323121 | A1* | 11/2017 | Liu | G06F 21/57 |
| 2018/0025148 | A1* | 1/2018 | Jain | H04L 9/3234 713/166 |
| 2018/0336756 | A1* | 11/2018 | MacKinnon | G07F 19/2055 |
| 2019/0228156 | A1* | 7/2019 | Thumati | G06F 21/50 |
| 2020/0186523 | A1 | 6/2020 | Kursun | |
| 2020/0295938 | A1 | 9/2020 | Matovsky | |
| 2020/0382295 | A1* | 12/2020 | Howells | H04L 9/3066 |
| 2021/0064745 | A1* | 3/2021 | Bouguerra | G06N 3/063 |
| 2021/0091829 | A1* | 3/2021 | Shake | H04B 7/0868 |
| 2021/0182436 | A1* | 6/2021 | Bennison | G06F 21/71 |
| 2022/0300612 | A1* | 9/2022 | Yamamoto | G06F 21/14 |
| 2024/0086534 | A1* | 3/2024 | Yamanaka | G06F 21/552 |
| 2024/0296217 | A1* | 9/2024 | Remer | G06F 21/44 |

FOREIGN PATENT DOCUMENTS

| | | |
|---|---|---|
| CN | 101394276 A | 3/2009 |
| CN | 103605919 A | 2/2014 |
| CN | 104393997 A | 3/2015 |
| CN | 106462900 A | 2/2017 |
| CN | 108352989 A | 7/2018 |

\* cited by examiner

DEVICE AND METHOD FOR AUTHENITICATING HARDWARE AND/OR EMBEDDED SOFTWARE

CROSS REFERENCE TO RELATED APPLICATIONS

This patent application is the US National Phase of International Application No. PCT/BR2022/050015 having an International Filing Date of 19 Jan. 2022, which claims priority on and the benefit of Brazilian Patent Application No. 10 2021 001278-1 having a filing date of 22 Jan. 2021.

BACKGROUND OF THE INVENTION

Technical Field

The present invention is located in the fields of Computer, Electronic and Electrical Engineering. More specifically, the invention relates to a device and a method for verifying the authenticity of hardware and its embedded software. The method of the invention comprises the steps of: a) obtaining an identified record of each unique hardware and software device; b) subsequently interrogating this same unique hardware and software device to compare said identified record obtained in the interrogation with that previously recorded; and c) identify corruption, tampering and/or intrusion/eavesdropping of the hardware/embedded software set when comparing the records does not result in a match. The present invention is particularly useful for authenticating hardware and embedded software, identifying eavesdropping and/or tampering with hardware and/or software, locally or remotely, at a single time, periodically or continuously. The invention is useful, among others, to ensure the reliability of data and/or metrics of technical and/or economic relevance measured by an integrated set of hardware and software, including equipment or devices for measuring and documenting quantities of environmental interest, authentication of integrity for certifying entities of environmental conservation projects, integrity authentication of voting machines, and integrity authentication of payloads of satellites, space artifacts and/or embedded software in these artifacts or satellites.

Prior Art

US20080005798A1 entitled "Hardware platform authentication and multi-purpose validation", discloses methods and apparatus that allow the authentication of a hardware platform on a network. Said authenticated hardware platform can validate the credentials of virtual machines running on the hardware platform. Hardware platform authentication on the network allows network access to validated virtual machines. Network access for virtual machines is managed by the hardware platform, even allowing differentiated accesses based, for example, on the security posture of each virtual machine. Said method comprises the steps of: a) authenticating a hardware platform of a device with a network authentication authority of a network of devices to produce a hardware platform network authentication, the network authentication produced independently of a device operating system, hardware platform having multiple partitions running on the hardware platform; b) validate one or more authenticated hardware platform partitions; and c) controlling network access of one or more partitions with the authenticated hardware platform based, at least in part, on a result of partition validation. Said document has a purpose that is similar to that of the present invention but does not apply to hardware with embedded software that must be moved between a supplier thereof and its customers and may have one or more of its components tampered with in transport by third parties.

CN101394276A, titled "Authentication system and method based on USB hardware token", discloses an authentication system based on USB hardware token. Said system comprises: an application system server, an application system terminal, an authentication server and an authentication device; wherein the authentication device is a hardware token having a USB interface, the hardware token having an indication, a light, and a confirmation button for prompting the user's application system terminal to request data exchange, the button confirmation is used for the user to confirm the data exchange between the hardware token and the application system terminal; the application system server is used to execute the key on the user. The operation turns on the indicator on the hardware token, prompting the user to press the confirm button on the hardware token to make the hardware token perform the algorithm calculation and determine whether the user key operation is successful according to the authentication result finally returned by the authentication server; the application system terminal is configured to forward the result of the data generated by the hardware token by the algorithm to the application system server; the authentication server is configured to compute the algorithm generated by the hardware token received from the application system server. Data results are authenticated and certification results are returned to the application system the Service is on. This invention is limited to authenticating a user in relation to his access to a set of hardware and software, not guaranteeing the authenticity of this set being accessed.

CN103605919A entitled "Method and device for generating software authentication files and method and device for authenticating software" discloses a method and device for generating software authentication files and a method and device for authenticating software. Said method for generating the software authentication files includes acquiring hardware information to be encrypted; perform RSA (Rivest-Shamir-Adleman) encryption on the hardware to be encrypted in order to generate initial encrypted authentication files; perform RC (Rivest Cifer) 4 encryption on the initial encrypted authentication files to generate the encrypted authentication files. The method and device for generating the software authentication files and the method and device for authenticating the software have the advantages that the hardware information to be encrypted is double-encrypted by the method and device for generating the authentication files for software, encrypted authentication files are double decrypted by software authentication method and device, and consequently, security can be improved in software authentication procedure.

CN104393997A, titled "Software and Hardware Collaborative Authentication Method of the Kyropoulos Sapphire Technology Center" discloses a method comprising the following steps: configuring a hardware identity characteristic authentication algorithm and a software key authentication algorithm on a client network remote user; after accessing the network remote user client on the network through hardware, reading a MAC address of the network remote user client by software key authentication algorithm, and acquiring an encryption key that belongs only to the MAC address of the center of technology; communicate data with the encryption key between the remote network client and the technology center; connecting the hardware identity feature authentication algorithm with the technology center via the Internet and reading a hardware identity feature code which is installed internally in the hardware; send the hardware identity feature code to the technology center; establish a task connection with the network remote user client after successfully completing authentication by the technology center. The method described in said patent employs identifiers created for the hardware and the use of clients' MAC addresses.

CN1447269A, titled "Certificate authentication system and method based on hardware characteristics", discloses a certificate certification system and method based on hardware characters. Said system includes: a certification server uses a hardware certificate encrypting digital certificate containing end hardware character of the client to form the encrypted file sent to the end user who uses the hardware certificate to decrypt the encrypted file to obtain a provided digital certificate on an enforced server providing the digital certificate to a certification server to verify certification completion. The system includes an end-user hardware character collector used in hardware certification generation according to the collected hardware character, a certification server, an end client, and an applied server. It includes the following steps:

In the first step, the authentication server encrypts the digital certificate using a hardware certificate containing the client's hardware characteristics, then forms an encrypted file and sends the encrypted file to the client;

In the second step, the client decrypts the received encrypted file using a hardware certificate to obtain a digital certificate and provides the digital certificate to the application server; and In the third step, the application server provides the digital certificate to the authentication server to verify the completion of authentication.

CN106462900A refers to a security token to certify authentication, and a method to obtain it. Said security token for certificate authentication comprises a security chip comprising: a keypair generation module for generating a pair of a private key and a public key for an authentication certificate; a digital signature module for generating a digital signature based on the authentication certificate; an internal memory for storing the authentication certificate, the private key and the public key; a near field communication (NFC) module for performing NFC with a wireless terminal; and a controller for controlling the key pair generation module, the digital signature module, the internal memory and the NFC module. Said document is based on the concept of a pair of keys (public, private) and a hardware device that allows verification of authenticity using NFC communication.

US20200295938A1, entitled "System, method and computer program product for performing hardware-backed password-based authentication", discloses a system, method, and computer program product for performing hardware-backed password-based authentication. In operation, a system receives a request to access the software using password-based authentication. In addition, the system receives a password for password-based authentication. The system computes a hash using the password and a hardware-based authenticator associated with the system's hardware. In addition, the system verifies that the computed hash using the password and hardware-based authenticator is correct to access the software. Said method comprises the steps of:

receiving, by a system, a request to access the software using password-based authentication;

receipt, by the system, of a password for password authentication;

compute, by the system, a hash using the password and a hardware-based authenticator associated with the system hardware; and verify, through the system, that the hash computed using the password and hardware-based authenticator is correct to access the software.

The method of said document aims to authenticate users using software and hardware, without authenticating the hardware and software set itself.

U.S. Pat. No. 10,749,686B2, titled "System and method for authenticating multiple separate objects using one signature via chain of trust", discloses a method for authenticating two distinct objects using a single signature stored in one of the objects. On booting a hardware system, a valid hash value can be generated based, at least in part, on a root disk file, and a kernel can be modified to contain the valid hash value. On subsequent hardware system boots, the valid hash value stored in the kernel can be compared with a value from a potential root disk file, and if the valid hash value and the root disk hash value match, the hardware system can continue with the startup process. Said method comprises the steps of:

access a kernel;

determining a valid hash value associated with said kernel;

access a potential root disk;

determining a potential root disk hash value associated with said potential root disk, wherein said step of determining said potential root disk value is based at least in part on a hash table associated with the potential root disk;

comparing said valid hash value and said potential root disk hash value;

authenticate said potential root disk, if said valid hash value and said potential root disk hash value are identical x;

rejecting said potential root disk if said valid hash value and said potential root disk hash value are different;

determining said valid hash value from a valid root disk, wherein said step of determining said valid hash value from said valid root disk is based at least in part on a hash table associated with said root disk valid; and encoding a valid hash value within said kernel.

The method described in that document employs a hashing system to verify the integrity of a boot disk via its operating system kernel and a root disk.

US20140365755A1, titled "Firmware authentication in Information Handling Systems (IHSs)" discloses an IHS that may include a controller having a memory, the memory configured to store a plurality of firmware volumes, each of the plurality of firmware volumes including a plurality of firmware files. The IHS may also include a Basic Input/Output System (BIOS) operatively coupled to the controller, the BIOS having program instructions stored therein which, upon execution, cause the BIOS to authenticate two or more firmware files within a given one of the plurality of firmware volumes using a single digital signature. In another embodiment, a method can include creating a firmware volume, adding a plurality of firmware files to the firmware volume, and creating a digital signature based on at least one of the plurality of firmware files, wherein the digital signature, when authenticated, allows a BIOS to load any of several firmware files. This method guarantees the authentication of firmware stored in a given hardware.

US20200186523A1, entitled "System and Method for Device and Transaction Authentication", discloses a system for using unique device and user identifiers to perform authentication of a user, device and/or transaction. In particular, the system may use biometric device profiles and/or user identifiers to generate a uniquely identifiable signature for each user and/or device. Single signature can then be used to authenticate devices as well as transactions sent by those devices. In this way, the system increases the security of device authentication, helping to prevent the use of device hijacking methods that exploit conventional authentication practices. Said document allows authenticating the user, storing their biometric credentials, along with the profile of installed software and hardware response times, both in a blockchain. Over time, it is expected to have a unique signature of the hardware through a sum of its behavior and installed software with its serial number, its type and other manufacturing data.

CN108352989A, titled "Electronic device and method for authenticating identification information thereof", discloses an electronic device. The electronic device includes a communication interface; a memory configured to store first identification information corresponding to an external electronic device and second identification information corresponding to a communication processor (CP) of the external electronic device and a processor, wherein the processor is configured to generate authentication information based on at least the first identification information and the second identification information generate an electronic signature corresponding to the authentication information by encrypting at least a portion of the data related to the authentication information and transmitting the electronic signature to the electronic device external using the communication interface. What is disclosed in said document seeks to register the electromagnetic signature of the hardware device to be authenticated, as well as the hashes of the software installed on it. However, it is not capable of detecting variations in the signature measurement between different signature measurement devices which leads to a false positive of an adulterated device even with small variations. The present invention solves these problems.

US20140289835A1, titled "Devices, Systems and Methods for Security Using Magnetic Field Based Identification", discloses devices, systems, and methods for determining an electromagnetic signature to authenticate a device, a user and/or a location. A magnetometer captures an electromagnetic signature which is then compared to one or more authorized electromagnetic signatures. If the electromagnetic signature matches an authorized electromagnetic signature access is granted. The magnetometer is integrated into a communication device that has a processor and logic. The magnetometer captures an electromagnetic signature from a surrounding environment and detects movement of the communication device through the captured electromagnetic signature. Logic in the communicating device locks or unlocks device features based on the captured electromagnetic signature. In other embodiments, the magnetometer is in communication with a server that authenticates a user or communicating device to provide access to a remote location. The approach of said document uses a binary classification of the electromagnetic signature of the device ("match"/"mismatch"), not allowing space for natural measurement variations and may generate false positives. Furthermore, it employs magnetic signatures for places, which are not immutable and therefore can also generate false positives. The present invention solves these problems.

US20140082720A1, titled "Method and System for Authentication of Device Using Hardware DNA" discloses methods and systems for authenticating a device. The method includes transmitting an energy to the device including a material, monitoring a device's response to the transmitted energy, generating a device signature based on the device's response to the transmitted energy, comparing the device signature to a signature for the device, and indicating that device authentication is successful when the generated signature matches the registered signature. The system includes a transmitter configured to transmit an energy toward the device, a receiver configured to monitor a response from the device, and a processor configured to generate a device signature based on the device response, compare the device signature to a recorded signature for the device and indicate that device authentication is successful when the generated signature matches the registered signature. The approach of said document does not consider that it is possible to maintain the electrical signature while changing the input and/or output of the device, using a device that changes the input, for example, artificially raising the reading and making the software read a false data, however a second device having electrically the opposite effect on the circuit is installed after the input and processing path, so that the electrical signature is maintained, even tampering with the input.

US20130047209A1 titled "Authentication Processing Method and Apparatus" discloses a Physical Unclonable Function (PUF) device and PUF reader that extracts the PUF parameters needed to calculate a response output from a challenge input, analyzing a PUF device operation. The operating parameters that characterize an operating state are obtained by observing an energy waveform, an electromagnetic waveform, or a processing time of the PUF device at that moment. PUF device authentication is based on the extracted parameters. The PUF reader performs authenticity determination as to whether or not the PUF device is a valid PUF device by monitoring a PUF device operation during response generation based on the operation parameters. The invention also does not have the ability to detect changes that change the inputs and outputs symmetrically, as described above.

The co-pending patent application BR102019021409-0, entitled "Conservometer, Equipment and System for Signal Transduction into Conservation Credits and for Documenting Metrics for Conservation or Recovery of Environmental Assets", also by the present inventors, constitutes one of the embodiments in which the present invention is advantageously applied.

None of the methods described above guarantee the authenticity of any set of hardware and software, without making any changes to the hardware or software. Furthermore, the invention described herein is also useful when the assembly is moved from a supplier to a customer. None of the known methods is capable of detecting tampering in the hardware set made on its printed circuit boards, for example, adding electronic components such as resistors and capacitors, which can tamper with inputs or outputs, or installation of eavesdropping devices that do not interfere with the processing performed by the hardware, but they copy information from the target device.

Additionally, none of the methods listed above is capable of, in addition to storing the hash of the embedded software in the hardware, verifying the authenticity of the inputs and outputs of the embedded software, especially applications with specific purposes, inputs and outputs that may have been tampered by electronic components added as previously described. In this way, none of the listed methods is capable of guaranteeing that an integrated set of hardware and software employed, for example, but not limited to, acquisition and measurement tasks of physical quantities, maintained its authenticity after moving between the sites of a supplier and a customer, or between any two sites without supervision, or even during a period of operation in the field without supervision. The present invention allows, in addition to the basic hash and electromagnetic signature checks, the response of the hardware and software set through the hardware outputs to be verified, thus small circuits that can be used to tamper with inputs or outputs, tampering therefore measured or calculated values are detected indirectly through these tests.

From what can be deduced from the researched literature, no documents were found anticipating or suggesting the teachings of the present creation/confidentiality/invention. The invention herein disclosed has, in the eyes of the inventors, novelty and inventive step compared to the state of the art.

BRIEF SUMMARY OF THE INVENTION

The present invention solves a recurrent technical problem related to the security of digital systems consisted of hardware and software by providing the guarantee of authenticity of these systems, that is, that the system being accessed is what is expected and not a corrupted or tampered version thereof, or even another system that impersonates the expected system.

The system of the invention provides authenticity verification for the hardware/software set or separately for hardware or software, ensuring that one, the other or both are true.

Embedded Software is software intrinsically linked to the hardware in which it is encapsulated. Therefore, authenticating embedded systems means authenticating both the software and the hardware that make up such a system. Thus, a secure way to ensure full authentication of an integrated hardware and software system is to define an integrated authentication method for both hardware and software.

Methods such as those described in the prior art provide only partial authentication or else require that the hardware and/or software to be authenticated be modified in order to guarantee authentication which can lead to undesirable changes in the hardware and/or software design.

The present invention provides a device and method that guarantees the authenticity of the hardware and software set and also:
  i. it is integrated, providing the guarantee of hardware authenticity and its embedded software simultaneously;
  ii. identifies tampering in the set, either in the outputs produced by the hardware and software set, or in the form of eavesdropping;
  iii. It requires no design or implementation changes to the hardware or software to implement and function correctly;
  iv. it avoids false positives due to small variations, typical of different devices and/or measurement environments, in the verification of the electromagnetic signature of the hardware;
  v. protects from situations where small electronic components, such as, but not limited to, capacitors or resistors, may be integrated into the hardware printed circuit board, in such a way as to tamper with the hardware's inputs or outputs, while maintaining its electromagnetic signature.

The present invention solves these problems and provides a hardware authentication method and its embedded software, identifying whether there has been any tampering with any embedded software and/or hardware inputs and/or outputs, in addition to identifying whether there is any device with or wireless implanted on the hardware board used to improperly transmit the data acquired and/or generated by the set of hardware and software.

The inventive concept common to the objects of the invention is a hardware authentication method and its embedded software that comprises the following steps:
  obtaining an identified record of each unique hardware and software device;
  subsequently interrogating this same single device of hardware and software, for the comparison of said identified record obtained in the interrogation with that previously recorded; and
  identifying corruption, tampering and/or intrusion/eavesdropping of the hardware/embedded software set when comparing records does not result in a match.

In one embodiment of the present invention, said unique identified record of each hardware and embedded software is selected from:
  one or more hashes;
  the correspondence between the input value of one or more signals to a hardware and embedded software set and the output value of said signal(s) and/or the response time of the output signal(s);
  an electromagnetic signature, and/or
  combinations thereof.

One of the objects of the invention is a hardware and its embedded software authentication method comprising the following steps:
  obtaining an identified record of each unique hardware and software device by recording, specific to each unique device:
    one or more hashes;
    the correspondence between the input value of one or more signals to a hardware and embedded software set and the output value of said signal(s) and/or the response time of the output signal(s); and/or
    an electromagnetic signature;
  subsequently interrogate this same single hardware and software device for the assessment:
    the identity of the hash(es) with the previously stored one(s);
    the result of the correspondence test between the input value of one or more signals to a hardware and embedded software set and the output value of said signal(s) and/or the response time of the output signal(s), with the respective previously stored values; and/or
    the similarity degree of the current electromagnetic signature with the previously stored electromagnetic signature of the device,
  identify corruption, tampering and/or invasion/eavesdropping of the embedded hardware/software set when:
    one or more hashes are different;
    the signal test points out non-correspondence between the signals and/or its response time; and/or
    when the electromagnetic signature is outside the similarity range previously established.

It is another object of the invention to provide a method for authenticating the integrity of devices or equipment for measuring physical quantities of environmental interest.

It is another object of the invention to provide a method for authenticating the integrity of environmental conservation projects for certifying entities.

It is another object of the invention to provide a method of authenticating the integrity of voting machines.

It is another object of the invention to provide a method of authenticating the integrity of satellite payloads, including micro or nanosatellites, space artifacts, sounding rocket payloads and/or the embedded software in these artifacts or satellites.

Another object of the invention is a device for authentication of embedded hardware and software comprising:
input and output physical interfaces for connection to the hardware and/or software set to be authenticated;
a microprocessor configured to:
send one or more signals to the hardware and embedded software assembly to be authenticated to interrogate it for a uniquely identified record of each hardware and embedded software;
receiving back said signals;
check the conformity between the unique record of the hardware and embedded software obtained from the interrogation and the unique record previously identified and stored; and
send a signal to a physical and/or digital medium to report compliance or non-compliance.

In one embodiment, a hardware and embedded software authentication device is provided comprising:
physical input and output interfaces for connection to hardware containing embedded software, to be authenticated; and
a microprocessor configured to:
send one or more signals to the hardware containing embedded software to be authenticated to interrogate it as to:
interrogate it for one or more hash(es);
test the signal by matching the input value of one or more signals from the hardware and embedded software set and the output value of said signal(s) and/or the response time of the output signal(s); and/or
interrogate it regarding the electromagnetic signature of the hardware and software set;
receiving back said signals;
verify the identity of the measured hashes with previously stored hashes; comparing the signal test result with previously stored corresponding values; and/or compare the electromagnetic signature obtained from the interrogation with the previously stored electromagnetic signature, linked to the hardware/embedded software set to be authenticated; and
send a signal to a physical and/or digital medium to report compliance or non-compliance.

In one embodiment, an identified record of the hardware and software set consisting of: a hash generated by combining the hardware device's serial number with the binary code of the embedded software-integrating the identity of both, photos of the hardware device, and timestamp (in milliseconds) obtained at the time of hardware assembly completion. A second hash can be generated by combining the hardware serial, binary code of the embedded software and date-time, the latter with the function of checking whether the date-time stored and subsequently read matches the original one.

In one embodiment, the identified record of each unique hardware and software device is stored remotely, case in which the comparison of the respective record (which may include: hashes; pictures, timestamps, the correspondences between the values of input and output signals and/or the respective response time; and/or the electromagnetic signature of the hardware device) with the record from the interrogation is performed remotely.

These and other objects of the invention will be immediately appreciated by those skilled in the art and by companies with interests in the segment and will be described in sufficient detail for its reproduction, in the following description.

BRIEF DESCRIPTION OF THE DRAWINGS

The following figures are shown:

In FIG. 1, the element numbered 1 is the Device Under Authentication (DSA), the element numbered 3 is the Authentication Verification Device (DVA) and the elements numbered 2 are the Physical Input and Output Interfaces (IFES) present both in the DSA and in the DVA and that exchange authentication data between both. DSA is iconically represented by a printed circuit board, although such a device is not limited to just one board, it can be a more complex device, composed of several boards. DVA is represented iconically by a personal computer, which can be a personal computer, a microcontroller, or any other computer element, as long as it has the necessary IFES for communication as a DSA. The interfaces are represented iconically by lines, and should be interpreted as insulated cables, manufactured, and installed according to the technique for readings free of electromagnetic interference, temperature, and humidity.

In FIG. 3, A is the representative point of an original reading and B is a point read later and considered "equal" to A within the tolerance window concept.

DETAILED DESCRIPTION OF PREFERRED EMBODIMENTS

Figure 1:
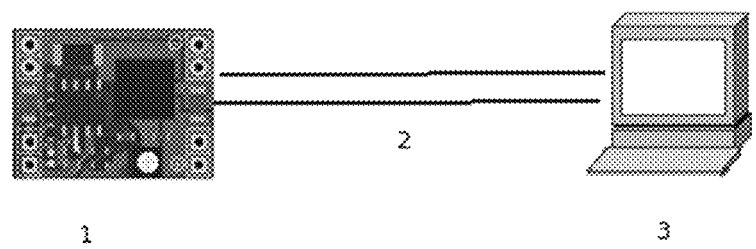
FIG. 1 schematically shows a configuration embodiment in which the present invention performs its function.

In the present invention, the expression "authentication" refers to proving that a certain object, whether hardware or software, is what it is expected to be and has not been replaced or had its content or composition corrupted in any way. The expression "embedded software" refers to code in binary language written specifically to be encapsulated and dedicated to a certain hardware or device that will control it, through a set of predefined tasks that use specific resources of that hardware.

In the present invention, the expression "authentication" also includes identifying and reporting any corruption, tampering and/or invasion/eavesdropping of the hardware/embedded software set. In the present invention, eavesdropping is the action of obtaining information improperly read or generated by a set of hardware and software, through a wired or wireless device, installed or connected to the target set by a third party who does not have the proper authorization to do it.

Authenticating digital systems composed of hardware and embedded software means authenticating these two elements in an integrated way. Thus, a safe way to ensure full authentication of a system composed of hardware and software is to define an integrated hardware and software authentication method.

The present invention is also defined by the following clauses.

Hardware authentication method and its embedded software comprises the following steps:
  obtaining an identified record of each unique hardware and software device;
  subsequently interrogating this same single device of hardware and software, for the comparison of said identified record obtained in the interrogation with that previously recorded; and
  identifying corruption, tampering and/or intrusion/eavesdropping of the hardware/embedded software set when comparing records does not result in a match.

Method as described above wherein said unique identified record of each hardware and embedded software is selected from:
  one or more hashes;
  the correspondence between the input value of one or more signals to a hardware and embedded software set and the output value of said signal(s) and/or the response time of the output signal(s);
  an electromagnetic signature, and/or combinations thereof.

Method as described above comprising the following steps:
  obtaining an identified record of each unique hardware and software device by specific record to each unique device of:
    one or more hashes;
    the correspondence between the input value of one or more signals to an embedded hardware and software set and the output value of said signal(s) and/or the response time of the output signal(s); and/or
    an electromagnetic signature;
  subsequently interrogating this same single hardware and software device for the assessment of:
    identity of the hash(es) with the one(s) previously stored;
    result of the correspondence test between the input value of one or more signals to a hardware and embedded software set and the output value of said signal(s) and/or the response time of the output signal(s), with the respective previously stored values; and/or
    similarity degree of the electromagnetic signature with the previously stored electromagnetic signature,
    identifying corruption, tampering and/or invasion/eavesdropping of the hardware/embedded software set when:
    one or more hashes are different;
    the signal test points out non-correspondence between the signals and/or its response time; and/or
    when the electromagnetic signature is outside the similarity range previously established.

In one embodiment, the steps of the method described above are implemented by at least one microprocessor, which is capable of operating by means of instructions previously stored or provided by a remote system.

Method as described above in which the identified record of each unique hardware and software device is stored remotely, the step of comparing the respective record with the record being originating from the interrogation performed remotely.

Method for verifying the integrity of hardware and software of equipment or devices for measuring and documenting quantities of environmental interest comprising the steps of the first clause described above.

Method for verifying, by certifying entities, the integrity of hardware and software of environmental conservation projects comprising the steps of the first clause described above.

Method for verifying the integrity of hardware and software of electronic voting machines comprising the steps of the first clause described above.

Method for verifying the hardware and software integrity of Space Artifacts payloads comprising the steps of the first clause described above.

Device for hardware and embedded software authentication comprising:
  physical input and output interfaces for connection to hardware containing embedded software, to be authenticated; and
  a microprocessor configured to:
  send one or more signals to the hardware containing embedded software to be authenticated to interrogate it for a uniquely identified record of each hardware and embedded software;
  receive back said signals;
  check the conformity between the unique record of the hardware and embedded software obtained from the interrogation and the unique record previously identified and stored; and
  send a signal to a physical and/or digital media to report compliance or non-compliance.

Device as described above comprising:
  physical input and output interfaces for connection to hardware containing embedded software, to be authenticated; and a microprocessor configured to send one or more signals to hardware containing embedded software to be authenticated to interrogate it as to:
  interrogate it for one or more hash(es);
  test the signal by correspondence between the input value of one or more signals from the hardware and embedded software set and the output value of said signal(s) and/or the response time of the output signal(s); and/or
  interrogate it regarding the electromagnetic signature of the hardware and software set;
  receive back said signals;
  verify the identity of the measured hashes with the identity of the previously stored hashes; comparing the signal test result with previously stored corresponding values; and/or compare the electromagnetic signature obtained from the interrogation with the previously stored electromagnetic signature, linked to the hardware/embedded software set to be authenticated; and
  send a signal to a physical and/or digital media to report compliance or non-compliance.

Device as described above wherein said hash(es) comprise(s): the serial number of the hardware device and the binary code of the embedded software.

Device as described above further comprising a remote communication interface for providing comparison of the identified record of the unique hardware and software device stored remotely with the respective record arising from the interrogation performed locally.

In one embodiment, the present invention starts from a configuration like the one represented in FIG. 1 for its correct operation. In FIG. 1, the numbered element 1 is the Device Under Authentication (DSA), the numbered element 3 is the Authenticity Verification Device (DVA) and the numbered elements 2 are the Physical Input and Output Interfaces (IFES) present both in the DSA and DVA and that exchange authentication data between them.

In the present invention, the Device Under Authentication (DSA) is the hardware device combined with embedded software which authenticity is to be verified.

In the present invention, the IFES are input, output or input and output interfaces connecting the Device Under Authentication to other devices, being also used to authenticate it.

IFES can be connected by physical means, such as wires or cables, such as, for example, but not limited to ports, Serial, Parallel, USB, RJ45 and/or others, as well as by electromagnetic means, such as, for example, but not limited to, antennas for Bluetooth, Wi-Fi, LoRa, UHF, VHF, GSM and other means of transmitting signals by electromagnetic waves.

When connected by physical means, cables must be used that guarantee the quality of the electrical signals that travel through them, avoiding interference created by electromagnetic signals external to the cables, humidity, and temperature, guaranteeing technical test conditions.

When connected by electromagnetic means (wireless), the appropriate devices and communication protocols must be used and there must be a guarantee that there is no electromagnetic interference in the test environment, as well as guaranteed technical test conditions.

In the present invention, the Authenticity Verification Device (AVD) is a computer element, which may be, for example, but not limited to, a personal computer or a microcontroller, used to inject data into the DSA and verify, through a test application, the authenticity of the DSA.

In one embodiment, it is a condition for the operation of the method described here that both DSA and DVA have the appropriate IFES to perform the authenticity tests.

In the present invention, "basic software" is considered as a type of program essential for the operation of a computer element, such as, but not limited to, the operating system, as well as the set of device drivers, which may be contained or not on an operating system. The basic software is, therefore, software embedded in the DSA that allows the operation of its basic functions, hence the name, such as reading the physical interfaces, sending data, managing primary memory and other functions.

A DSA can have one or more basic embedded software.

In the present invention, "target application" is an embedded software in the DSA allowing it to have some function beyond the basic ones, performing computations with a specific purpose and intrinsically linked to the hardware on which it runs.

A DSA can have one or more embedded target applications.

Hash(es) Record

In the present invention, a "hash value" or simply "hash" is the transformation of a large amount of data into a small amount of information. A hash is a sequence of bits generated by a hash algorithm, usually represented in hexadecimal, which allows visualization in letters and numbers (0 to 9 and A to F). This sequence seeks to uniquely identify a file or information.

Hash values are generated by Hash functions which are algorithms mapping variable length data to fixed length data. In the present invention, any proven secure hash function can be used to generate hash values, such as, but not limited to, the 128-bit Whirlpool hash function.

In the present invention, hash values, or simply hashes, are used to uniquely identify files in binary or text format that make up the basic software and the target applications, as well as the test application, in order to create unique or private keys, that uniquely identify the software that is embedded in a given DSA and installed or embedded in the DVA.

In the present invention, a "remotely accessible database" is a database that is on a medium accessible by multiple computer elements and, consequently, by multiple human or automated users, such as, but not limited to, file servers on a network or cloud, database servers on a network or cloud, or even in distributed digital ledgers, such as those using Blockchain technology. Other technologies that make data available remotely in a safe and organized manner can also be employed.

In one embodiment, the present invention starts with a setup as shown in FIG. 1 for its correct operation. In FIG. 1, in the numbering sequence from 1 to 3, we have the Device Under Authentication (DSA), the Physical Input and Output Interfaces (IFES) and the Authenticity Verification Device (DVA).

Test Application

In one embodiment of the present invention, evaluating the correspondence between the input value of one or more signals to a hardware and embedded software set and the output value of said signal(s) and/or the response time of the output signal(s) is done by "test application." Said application is software that is installed or embedded in the DVA and its function is to inject inputs through one or more DSA input interfaces and read outputs through one or more DSA output interfaces. If the DVA is a personal computer, the test application is said to be installed on the DVA, if it is a microcontroller, the test application is said to be embedded in the DVA. The authentication process is independent of the type of DVA.

The Test Application implements via a computer program a Functional Authentication Method (MAF), described by a set of generic and independent steps of the DSA and DVA and which are based on the functionalities of the Target Application(s). In this embodiment, said test application is described according to the following steps:

1. Sort the DSA input IFES set represented by $E=\{E_1, E_2, \ldots, E_n\}$ and the DSA output IFES set represented by $S=\{S_1, S_2, \ldots, S_m\}$;
2. For Each Target Application:
   I. Create authentication test set A such that for each pair $(E_i, j)$, where $E_i \in E$ and j is a single or multiple input value, there is an assertion represented by the tuple $(S_k, I, t)$, where $S_k \in S$, I is an expected output value, singular or multiple and t is the expected time to obtain the output I in $S_k$. Test set A can alternatively be represented by a function that takes a value at a designated physical input and expects an output at a designated physical output, i.e. $f(E_i, j) \rightarrow (S_k, I, t)$. We say that $(S_k, I, t)$ is the assertion of $(E_i, j)$.
   II. For every test $\{(E_i, j), (S_k, I, t)\}$, inject input data through IFES, that is, inject j through $E_i$, which must be processed by the Target-Application and verify the output data and the execution time, that is, if the value I was read in $S_k$ and if the elapsed time was t or close to t. If the output data is I and if the elapsed time is close to it, then the assertion $(S_k, I, t)$ worked, and the next assertion must be checked until they run out. If the output data is not I or if the elapsed time is much greater or much less than t, then the assertion $(S_k, I, t)$ failed, generating an authentication FAIL.

As an example of an authentication test case $\{(E_i, j), (S_k, I, t)\}$, we have the high-level description $\{(Serial0, 10), (Wi-Fi, 5, 100)\}$, or that is, an input of value 10 on Serial0 should generate an output of value 5 on the Wi-Fi antenna, in about 100 ms. If an output value is different from 5 or the response time is much higher or much lower than 100 ms, the assertion will have failed, denoting some corruption in the composition of the DSA.

The concept of "much greater" or "much less" response time must be built into the Test Application, and must be calibrated against the types of hardware, underlying software, and Target Application(s) making up the DSA. It is up to the programmer who develops the Test Application to technically evaluate the acceptance interval for the response time variation.

Test Suite A can be based on the set of tests that are defined to test the functional and non-functional requirements of the Target Application(s). In fact, if there are automated tests that cover the requirements of the Target Application(s), these can be directly employed as a set of tests for authentication, forming the Test Application.

In the present invention, "supplier" means the organization or individual responsible for manufacturing or integrating the hardware and software that make up the DSA.

In the present invention, "user" means the organization or individual that employs the DSA and owns the DVA.

Electromagnetic Signature

The "electromagnetic signature" of a device is the spectrum generated by its electromagnetic emissions, or collection of signals emitted on a periodic basis. Such a spectrum can be represented by a collection of pairs, peaks, or points (x, y), where x is the amplitude and y the frequency of the electromagnetic signal.

In the present invention, two electromagnetic signatures are considered identical if all the peaks (x, y) composing them are equal, and they are similar if a percentage value of Limit of Similarity between the peaks is reached. This Limit of Similarity must consider the characteristics of the measurement process at the supplier and at the user.

As an example of Limit of Similarity, if the Electromagnetic Signature of a device is characterized by 50 peaks (x, y), and when compared with another signature, only 01 peak is observed with a different x and/or y value, then it says the similarity between the two signatures is 98%. If the Limit of Similarity is 95%, for example, then the two signatures are similar, since 98% is greater than 95%.

Figure 3:
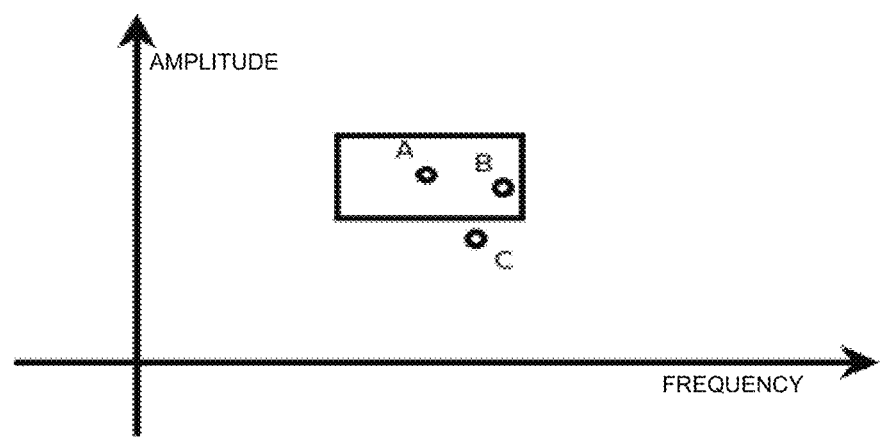
FIG. 3 shows a tolerance window with two points A and B, in space R2, describing the amplitude and frequency of signals read from some electromagnetic media. The signals are considered "equal" because they are in the same window. The window is defined by an amplitude distance on the x-axis and a frequency distance on the y-axis.

In the present invention, the concept of "equality" between peaks (x, y) of an electromagnetic signature can be defined through a two-dimensional window, called "tolerance window," used to define whether two peaks are "equal," as represented in FIG. 3. In this way, it is possible to deal with the inaccuracies inherent in the sign reading process, either on the supplier's site or on the user's site, preventing similar signatures from being classified as dissimilar due to reading problems and not because the DSA has been corrupted. In this way, the present invention also defines a method for determining the similarity between two electromagnetic signatures.

Thus, the present invention defines "strict equality" as the usual, mathematical one, and "proximity equality" as defined as described using the amplitude and frequency tolerance window.

As described in FIG. 3, starting from point A, which is a peak of an electromagnetic signature obtained at the supplier's site, distances are defined on the x axis (frequency) and on the y axis (amplitude), creating the tolerance window. All points that fall within this defined window during the reading of the electromagnetic signature made at the user's site will be considered "equal by proximity" or equivalent. For example, in FIG. 3, point B is within the tolerance window of A and therefore is "equal by proximity" or equivalent to A, whereas point C is outside the tolerance window and therefore is not equal or equivalent to A.

Electromagnetic Signature Verification Method

The present invention therefore defines an Electromagnetic Signature Verification Method (MVAE), implemented by a computer program, and described by the following steps of:

1. Defining the Limit of Similarity;
2. If using equality by proximity:
   I. Defining distance to amplitude;
   II. Defining distance to frequency;
3. Obtaining the reading of the Electromagnetic Signature performed on the supplier's website and store it in vector;
4. Obtaining the reading of the Electromagnetic Signature performed on the user's website and store it in a vector;
5. For each point of the Electromagnetic Signature obtained on the supplier's website:
   I. If strict equality is being used:
      a. Check if it is equal to the point of the same position in the vector of the Electromagnetic Signature obtained on the user's website;
      b. If different, increment counter of dissimilar peaks;
   II. If equality by tolerance window is being used:
      a. Check if the point of the same position in the vector of the Electromagnetic Signature obtained at the user's site is contained within the tolerance window;
      b. If different, increment counter of dissimilar peaks;

6. Calculate the Percentage of Dissimilar Peaks by dividing the dissimilar peak counter by the size of the vector created to store the electromagnetic signature obtained on the supplier's website;
7. If the percentage of different peaks equals zero, the Signatures are equal, if less than the Limit of Similarity, then the Signatures are similar, if greater, the signatures are dissimilar.

The Distances for Amplitude and for Frequency are MVAE parameters and can be defined in percentage or absolute terms.

The Test Method for Authentication (MTA), described in this invention, provides for the establishment of more rigorous Limits of Similarity when both the signature measurement conditions at the provider and at the user are technically ideal, or less rigorous when these conditions are not.

The present invention presents a Hardware and Embedded Software Integrated Authentication Method (MAIHSE), as described in FIG. 2, considering a hardware target device that you want to authenticate, the DSA, a data injector device, the DVA, and describing the method as follows:

i. On the supplier's website:
1. Install Basic Software on the DSA.
2. Install Target Application(s) on DSA.
3. Generate individual hashes for the DAS Basic Software, the DSA Target Application(s) and the DVA Test Application.
4. Determine the Electromagnetic Signature of the DSA turned on and not emitting signals from its wireless devices.
5. Determine the Electromagnetic Signature of each DSA wireless device.
6. Photograph the DSA with the focus axis perpendicular to the plane of the printed circuit board (PCB) of the DSA and at a distance that allows perfect framing, both front and back.
7. Assemble identified record of the unique hardware and software device containing: hashes generated in (a.3), signature generated in (a.4), signature(s) generated in (a.5), photos of the front and back of the device obtained in (a.6), serial number of the hardware device, established Limits of Similarity and timestamp in milliseconds obtained at the final moment of hardware assembly. The record's unique identifier is a combination of the DSA serial number and the timestamp.
8. Store unique device identified record in remotely accessible database.
9. Send DSA to user's site.

ii. On the user's site:
1. Receive DSA sent in a.9.
2. Get unique device identified record from remote database generated in a.7 and stored in a.8.
3. Check photos of the device, generated in a.6: check, by human (visual) or automated (computational) means, that the device is in the same state and with the same components as those present in the photographs. Not being returning FAILURE.
4. Check Base Software hash. If it is not identical to the one obtained from the identified record, return FAILURE.
5. Check hash of Target Application(s). If it is not identical to the one obtained from the identified record, return FAILURE.
6. Check DVA Test Application hash. If it is not identical to the one obtained from the identified record, return FAILURE.
7. Physically connect the DVA to the DSA, using the appropriate IFES, with the appropriate cables according to the technical specifications, or providing wireless connections when applicable.
8. Using the DVA Test Application, activate the Target Application(s) in the DSA.
9. Using the DVA Test Application, test the DSA against the Test Method for Authentication (MTA).

A FAILURE in ii.3 means that visual, manual, or automated inspection has identified some tampering with the DSA hardware.

A FAIL in ii.4 means that some tampering with the basic DSA software has been identified.

A FAILURE in ii.5 means that some tampering with the DSA Target Application(s) has been identified.

A FAIL in ii.6 means that some tampering with the DVA Test Application has been identified.

To determine SUCCESS OR FAILURE in step ii.9, the Test Method for Authentication (MTA) is followed.

The MTA is described as follows:

i. Isolate the DSA and DVA in an environment where they are the only two possible devices emitting electromagnetic waves;
ii. Turn on the DSA and measure its electromagnetic signature;
1. Use the Electromagnetic Signature Verification Method;
2. If the Electromagnetic Signature is identical or similar, proceed to the next step, if it is not identical or similar, return FAILURE.
iii. Turn on the DVA and measure its electromagnetic signature;
iv. Run the Test Application on the DVA:
1. If the Test Application runs all assertions successfully, check the electromagnetic signature of the DSA. If the Test Application returns any failed assertions, return FAILURE.
2. If all the electromagnetic signature during the tests is identical or similar to the expected one, return SUCCESS, otherwise return FAIL due to signature corruption.

The most probable cause of the electromagnetic signature corruption identified in ii.1 is the existence of a hardware component not identified on visual inspection (comparison with front and back photographs), which is emitting electromagnetic signals, usually using a channel of non-legitimate data transmission to send data to a non-legitimate receiver (eavesdropping).

The electromagnetic signature of the DVA is measured in iii in order to evaluate any interference of this on the electromagnetic signature of the DSA, considering that both are the only emitters in the environment in which the test is being carried out, as described in i.

The most probable cause of any failure assertion in iv.1, having the embedded software previously been verified via hash comparison, is the existence of an unidentified hardware component in the visual inspection (comparison with the front and back photographs) that is causing variation in the outputs generated by one or more Target Application(s).

The most likely cause of the corruption of the electromagnetic signature identified in iv.2 is the existence of a hardware component not identified in the visual inspection (checking the front and back photographs), nor in the assertion tests, which is emitting electromagnetic signals, usually, using a non-legitimate data transmission channel to send data to a non-legitimate receiver (eavesdropping).

Figure 2:
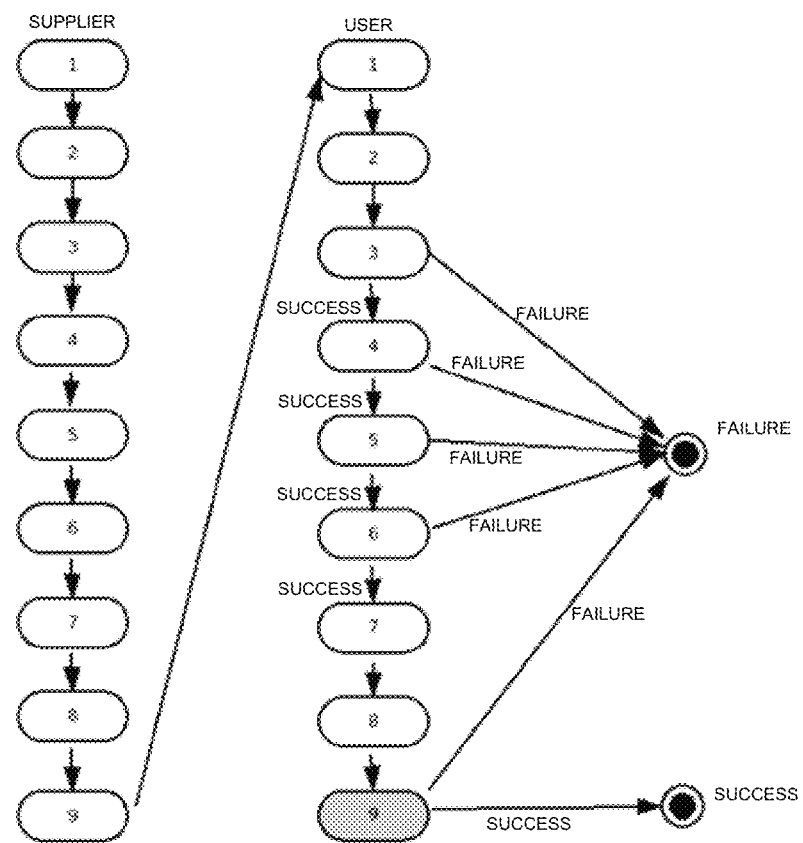
FIG. 2 shows a schematic representation of the authentication method flow, which can have two results, namely: SUCCESS, when all authentication conditions are met; or FAIL when one or more authentication conditions are not met. Although the flow represented in FIG. 2 shows FAIL from the first condition not met, the authentication test can proceed to identify if more than one condition is not being met, providing a complete audit of the Device Under Authentication.

The application of the Embedded Hardware and Software Integrated Authentication Method (MAIHSE) to the conservometer (DSA) is as described in FIG. 2, the method comprising the steps of:

a) On the conservometer supplier site:
1. Install Basic Software on the Conservometer.
2. Install Target Application(s) on the Conservometer.
3. Generate individual hashes for the conservometer Base Software, the Conservometer Target Application(s) and the DVA Test Application.
4. Determine the Electromagnetic Signature of the Conservometer turned on and not emitting signals from your wireless devices.
5. Determine the Electromagnetic Signature of each wireless device in the conservometer.
6. Photograph the conservometer with the focus axis perpendicular to the plane of the printed circuit board (PCB) of the conservometer and at a distance that allows perfect framing, both front and back.
7. Assemble identified record of the conservometer containing: hashes generated in (a.3), signature generated in (a.4), signature(s) generated in (a.5), photos of the front and back of the device obtained in (a.6), serial number of the hardware device, established Limit of Similarity and timestamp in milliseconds obtained at the final moment of assembly. The record's unique identifier is a composition between the serial number and the date and time.
8. Store unique device identified record in remotely accessible database.
9. Send data from the conservometer to the user site.

b) On the user's site:
1. Receive conservometer data sent in a.9.
2. Obtain unique device identified record from remote database generated in a.7 and stored in a.8.
3. Check photos of the device, generated in a.6: check, by human (visual) or automated (computational) means, that the device is in the same state and with the same components as those present in the photographs. Not being present, return it as a FAILURE.
4. Check Base Software hash. If it is not identical to the one obtained from the identified record, return it as a FAILURE.
5. Check hash of Target Application(s). If it is not identical to the one obtained from the identified record, return it as a FAILURE.
6. Check DVA Test Application hash. If it is not identical to the one obtained from the identified record, return it as a FAILURE.
7. Physically connect the DVA to the conservometer, using the appropriate IFES, with the appropriate cables according to the technical specifications, or providing wireless connections when applicable.
8. Using the DVA Test Application, activate the Target Application(s) in the DSA.
9. Using the DVA Test Application, test the conservometer according to the Test Method for Authentication (MTA).

Example 1—Use of MAIHSE to Authenticate the Conservometer

In this embodiment, the MAIHSE is employed to authenticate a conservometer as described in co-pending patent application BR102019021409-0, incorporated herein by reference, the conservometer being the DSA. The authentication of a conservometer guarantees that this device is performing correctly: the readings of input signals, the due computations, and the writings of output signals. In this way, in one embodiment, the use of MAIHSE in a conservometer ensures that there is no adulteration, either for more or for less, in the computation of environmental conservation metrics or Conservation Credits, as well as that no information is being unduly diverted to a third party. through some illegitimate communication channel grafted by this or another third party.

Example 2—Application Together with the Conservometer

In this embodiment, a Target Application performs computations for the conservometer device, obtaining the physical quantities read from the media from the primary memory and computing the environmental conservation metrics or Conservation Credits according to their origin.

Figure 4:
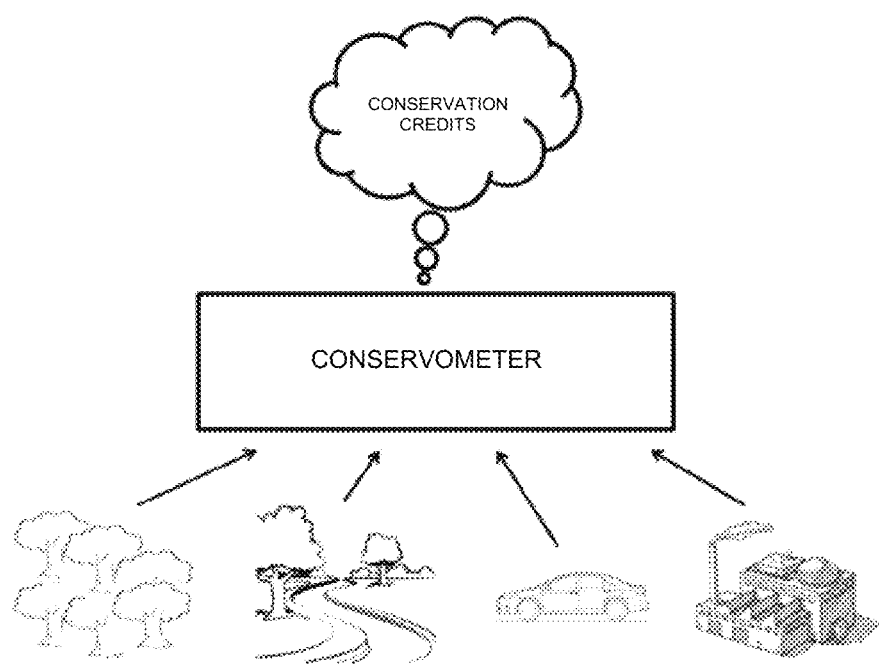
FIG. 4 schematically shows an implementation embodiment of the present invention in which different sources of environmental conservation or recovery data, from which conservation or recovery data of environmental assets are obtained and/or measured, such data or signals being processed in a conservometer and the corresponding metrics or conservation credits communicated in different communication environments. As a hardware device with embedded software, the conservometer is authenticated by the object of the present invention.

FIG. 4 schematically shows an implementation embodiment of the present invention wherein different sources of environmental conservation or recovery data, from which conservation or recovery data of environmental assets are obtained and/or measured, such data or signals being processed in a conservometer and the corresponding metrics or conservation credits communicated in different communication environments. As a hardware device with embedded software, the conservometer is authenticated by the object of the present invention.

Figure 5:
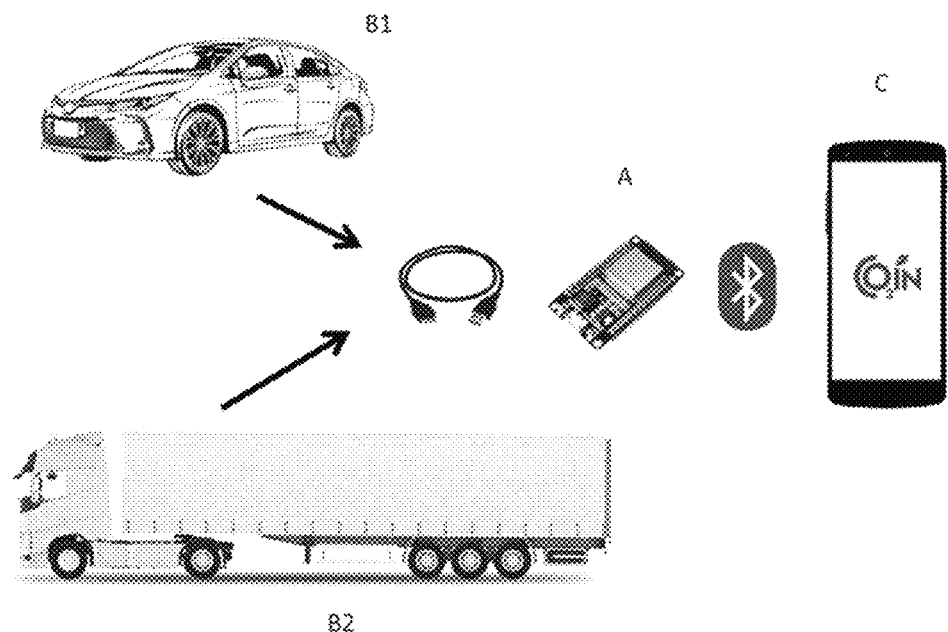
FIG. 5 shows details of an embodiment of the invention in which a conservometer communicates conservation metrics/credits as a $CO_2$ emission reduction metric for a hybrid vehicle (B1 or B2) equipped with a regenerative kinetic energy recovery system. In A) a data acquisition and communication device are shown schematically. In said embodiment, authentication is performed on device A) or on an integrated version thereof and embedded in the vehicle's control unit.

In this embodiment, the conservometer is installed in a vehicle equipped with a hybrid energy/propulsion system using liquid fuel and an electric motor powered by regenerative energy. In this context, the source for generating Conservation Credits is the vehicle itself and the objective metric is that resulting from the reduction in fuel consumption and consequent reduction in $CO_2$ emissions. FIG. 5 shows details of an embodiment in which a conservometer communicates conservation metrics/credits as a $CO_2$ emission reduction metric by a hybrid vehicle (B1 a passenger car, or B2 a trailer) equipped with an energy recovery system regenerative kinetics. In A) a data acquisition and communication device are shown schematically. In said embodiment, authentication is performed on device A) or on an integrated version thereof and embedded in the vehicle's control unit.

In this embodiment, the conservometer, that is, the system for measuring and computing environmental conservation metrics or conservation credits, is installed in the on-board computer or entertainment system of the hybrid vehicle, or even through a device connected to a standard port. OBD (On Board Diagnostics) of the vehicle.

The use of the present invention in conjunction with the conservometer provides the measurement, processing, and communication in real time of the environmental service provided by the vehicle in the form of reduction of greenhouse gas emissions. The corresponding conservation credits can be used by the vehicle owner, or by fleet owners, in: communication of social or environmental responsibility actions; use of said conservation credits in environmental compensation measures; an open credit trading market; or combinations thereof.

Example 3—Authentication of Electronic Voting Machine

Figure 6:
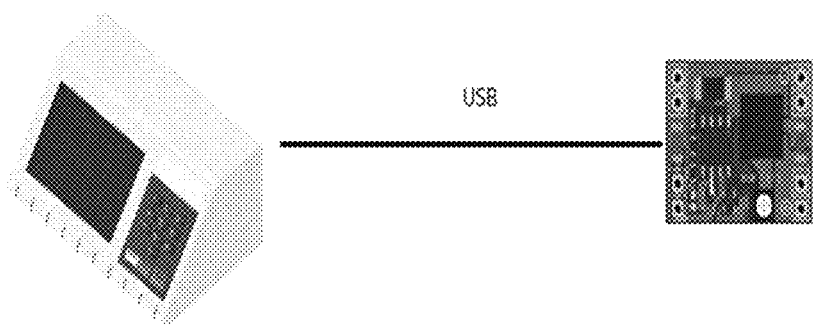
FIG. 6 schematically shows an application embodiment of the present invention for the authentication of electronic voting machines, which are hardware with embedded software. The device of the invention is physically connected to a data input of the voting machine, such as a USB port. The authentication process of the hardware and software set is performed as described in this invention and then, if SUCCESS has been obtained, said USB port is physically sealed, ensuring that the input and output data, related to electronic votes, are equivalent to what was expected.

FIG. 6 shows schematically an application embodiment of the present invention for the authentication of electronic voting machines, which are hardware with embedded software. The device of the invention is physically connected to a data input of the voting machine, such as a USB port. The hardware and software set authentication process is done and then the said USB port is sealed.

The device of this embodiment of the invention comprises:
physical input and output interfaces for connection to the electronic voting machine to be authenticated, integrated into a USB interface;
a microprocessor or another computer element configured to:
send one or more signals to the voting machine to be authenticated to interrogate it for a unique identified record of the voting machine;
receive back said signals obtained from the voting machine;
check the conformity between the single record of the voting machine obtained from the interrogation and the single record previously identified and stored; and
send a signal to a physical and/or digital media to report compliance or non-compliance.

In an alternative embodiment, the authentication device comprises a remote communication interface to provide the comparison of the identified record of the voting machine stored remotely with the respective record originating from the interrogation performed locally.

Example 4—Authentication of Satellite Payloads and Other Space Artifacts

In one embodiment, the invention can be employed to authenticate satellite payloads, including micro- or nanosatellites, or other space artifacts, such as, but not limited to, space experiments and sounding and experimental rocket payloads and/or even the basic software that command and control these artifacts or satellites. The term "artifact" will be used below to represent the listed categories and their similar/equivalent.

Due to the complexity of manufacturing, assembly, configuration and launch operations for spacecraft, it is common for an artifact to be prepared at one site, stored, and then transported to the launch site and stored again awaiting launch.

As batteries can discharge, causing loss of configuration, and sensors can become out of calibration during these waiting intervals in storage until launch, tests are carried out before launch to verify the basic state of the hardware and software of the space artifact. These tests, however, do not assess the integrity of the artifact in terms of the possibility that its hardware and/or software shipped by third parties may have been tampered with during transport or storage.

The situation of undue tampering with space artifacts is a typical concern for countries that do not have their own launchers, due to the possibilities of industrial espionage or even sabotage of the artifacts.

In this embodiment of the invention, the Target Applications in the case of space artifacts are the software that control their payloads and were previously installed during the assembly and configuration activities of the artifact.

In one embodiment, the parameters of the Electromagnetic Signature Test are more rigorous when the artifact is tested in an Anechoic Chamber, a facility found in assemblers of space artifacts.

In one embodiment, applying the Hardware and Embedded Software Integrated Authentication Method (MAIHSE) to a spatial artifact (DSA) comprises the steps of:
a) On the artifact owner or assembly and/or configuration site:
1. Generate individual hashes for the artifact Base Software, the Target Application(s) and the DVA Test Application.
2. Determine the Electromagnetic Signature of the artifact turned on and not emitting signals from its wireless devices.
3. Determine the Electromagnetic Signature of each wireless device in the artifact.
4. Photograph the artifact on each of its faces, which can be the top, bottom, port side, starboard side, front and rear, at a distance and angle that allows for perfect framing.
5. Assemble the device's identified record containing: hashes generated in (a.1), signature generated in (a.2), signature(s) generated in (a.3), photos obtained in (a.4), serial number or flight identifier of the artifact, established Limit of Similarity and timestamp in milliseconds obtained at the final moment of assembly. The record's unique identifier is a combination of the serial number or flight identifier and the date and time.
6. Store unique device identified record in remotely accessible database.
7. Send data from the artifact to the user site.
b) At the launch site, immediately before installation on the launch vehicle:
8. Receive artifact data sent in a.7.
9. Obtain unique artifact record from remote database generated in a.5 and stored in a.6.
10. Check photos of the artifact, generated in a.4: check, by human (visual) or automated (computational) means, whether the artifact is in the same state and with the same components as those present in the photographs. Not being present, return it as a FAILURE.
11. Check Base Software hash. If it is not identical to the one obtained from the identified record, return it as a FAILURE.
12. Check hash of Target Application(s). If it is not identical to the one obtained from the identified record, return it as a FAILURE.
13. Check DVA Test Application hash. If it is not identical to the one obtained from the identified record, return it as a FAILURE.
14. Physically connect the DVA to the artifact, using the appropriate IFES, with the appropriate cables according to the technical specifications, or providing wireless connections when applicable.
15. Using the DVA Test Application, activate the Target Application(s) in the DSA.
16. Using the DVA Test Application, test the artifact against the Test Method for Authentication (MTA).
c) If it is possible to access the device when it is already installed in the launching vehicle, at the last moment before this vehicle becomes unavailable for access, repeat steps 8, 9, 11, 12, 13, 14, 15 and 16. Step 10 is generally compromised due to the installation, electromagnetic signature verification activities are also compromised due to the presence of other artifacts as well as the electromagnetic noise of the launcher itself, therefore not being performed.

Example 5—Dual Authentication of Hardware and Embedded Software by an External Certifying Entity In another embodiment, the method described herein can be used in parallel by an External Certification Entity (ECE). This ECE acts as an "honest broker" in a device authentication process. An honest broker is an entity that is accepted by all parties involved in a given transaction as impartial and trustworthy.

In this embodiment, the supplier of a device to be authenticated provides it to a third party as a form of, for example, but not limited to, a system for measuring physical quantities. Device installation is performed by the third party and an ECE, acting as an honest broker, certifies that the installation was proper and the device has not been tampered with, thus ensuring that both device supplier and device user will have what they expect from the measurements.

In one embodiment, the supplier installs a Conservometer for a user who wants to measure the quantities of recovery and/or environmental conservation. The system of the invention verifies the installation of the Conservometer through the ECE, which then guarantees that both the supplier, through the Conservometer, and the user, through the installation of the Conservometer in a conservation or recovery system of environmental assets, are delivering what is waiting, in terms of measuring device and system to be measured. In this embodiment, the MAIHSE is employed by both the supplier and the ECE, a situation in which the hardware/software authentication is double-which provides increased confidence of the parties involved in the operation in which the target device is employed.

The technical dimension, also with several confidential information, includes the implementation of a proprietary system and/or technologies whose patent applications have not yet been disclosed.

The applicant, when filing this request with the competent/guarantor body, seeks and intends to: (i) name the authors/inventors in respect of their respective moral, copyright and property rights related to their works; (ii) unequivocally indicate that he is the owner of the business or industrial secret and the owner of any form of intellectual property that derives from it and that the depositor so desires; (iii) describe in detail the object content of the creations and the secret, proving its existence in the physical and legal planes; (iv) obtain protection for your spirit creations as provided in the Copyright Act; (v) establish the relationship between the examples/implementations and the creative, ornamental, distinctive or inventive concept according to the applicant's cognition and its context, to clearly demonstrate the scope of its intangible asset protected and/or protected; (vi) apply for and obtain the additional rights provided for patents, if the applicant chooses to proceed with the administrative procedure until the end.

Any future disclosure or publication of this document does not, in itself, constitute authorization for commercial use by third parties. Even if the content becomes part of the physical world accessible to third parties, the disclosure and publication of this document under the terms of the law does not eliminate the legal status of secret, serving only and only the spirit of the Law to: (i) serve as proof that the creator created the objects described herein and expressed them in a physical medium, which is this report itself; (ii) unequivocally indicate its owner/proprietor and authors/inventor(s);

(iii) make third parties aware of the existence of the creations and the aforementioned industrial secret, of the content for which intellectual protection is required or will be required under the terms of the Law, including patent protection and the date of its deposit, from which it will have rights of priority and the term of validity of the patent exclusivity may be initiated, if applicable; and (iv) assist in the technological and economic development of the Country, from the disclosure of the creation, if it occurs, and the authorization of the use of the secret solely and exceptionally for the purposes of studies and/or development of new improvements, thereby avoiding reinvestment parallel by third parties in the development of the same good.

It is immediately warned that any commercial use requires authorization from the authors or the owner/holder and that unauthorized use entails sanctions provided for by law. In this context, given the extensive detail according to which the creation, concept and examples were revealed by the applicant, those versed in the art will be able, without much effort, to consider other ways of realizing the present creation and/or invention in ways not identical to those merely exemplified above. However, such forms are or may be considered to be within the scope of one or more of the appended claims.

The invention claimed is:

1. A hardware authentication method and its embedded software, the method comprising the following steps:
  a) obtaining an identified record of each unique hardware and software device, the record selected from the group consisting of
    at least one hash with a correspondence between an input value of at least one signal to a hardware and embedded software set and an output value of said at least one signal and/or a response time of the at least one output signal,
    an electromagnetic signature, and
    combinations thereof;
  b) subsequently interrogating this same unique hardware and software device, for the comparison of said identified record obtained in the interrogation with that previously registered;
  c) identifying corruption, tampering and/or intrusion/ eavesdropping of the hardware/embedded software set when comparing records does not result in a match;
  d) conducting a parameterized verification of electromagnetic signature (MVAE) comprising the steps of
    i) defining a limit of similarity,
    ii) determining when equality use by proximity by at least one of setting distance to amplitude and setting distance to frequency,
    iii) obtaining the reading of the electromagnetic signature performed on a supplier's website and storing a reading of the electromagnetic signature performed on a supplier's website in a vector,
    iv) obtaining the reading of the electromagnetic signature performed on a user's website and storing the reading of the electromagnetic signature performed on a user's website in a vector,
    V) for each point of the electromagnetic signature obtained on the supplier's website:
      determining when strict equality is being used by checking if each point of the electromagnetic signature obtained on the supplier's website is equal to a point of a same position in a vector of the electromagnetic signature obtained on the user's website, and if different, incrementing a counter of dissimilar peaks; and determining when equality by tolerance window is being used by checking if the point of the same position in the vector of the electromagnetic signature obtained at the user's site is within the tolerance window and if different, incrementing the counter of dissimilar peaks;

vi) calculating the percentage of dissimilar peaks by dividing the counter of dissimilar peaks by the size of the vector created to store the electromagnetic signature obtained on the supplier's website; and vii) if the percentage of different peaks equals zero the signatures are equal, if less than the limit of similarity then the signatures are similar, if greater the signatures are dissimilar.

2. The method according to claim 1, further comprising the following steps:

e) obtaining an identified record of each unique hardware and software device by specific recording to each unique device, of at least one of:
the at least one hash;
the correspondence between the input value of the at least one signals to the hardware and embedded software set and the output value of said at least one signal(s) and/or the response time of the at least one output signal, and
the electromagnetic signature;

f) subsequently interrogating this same unique hardware and software device for the assessment of at least one of:
an identity of the at least one hash with the another one of the at least one hash that was previously stored,
a result of a correspondence test between the input value of the at least one signal to the hardware and embedded software set and the output value of said at least one signal and/or the response time of the at least one output signal with the respective previously stored values, and
comparing a similarity degree of the electromagnetic signature with the previously stored electromagnetic signature, and g) identifying corruption, tampering and/or invasion/eavesdropping of the hardware/embedded software set when at least one of:
the at least one hash is different from another one of the at least one hash;
the signal test points out non-correspondence between the at least one signals and/or the response time of the at least one signal, and
the electromagnetic signature is out of the similarity range previously established.

3. The method according to claim 1, wherein the identified record of each unique hardware and software device is stored remotely, with the step of comparing the respective record with the record arising from the interrogation being performed remotely.

4. The method according to claim 1 for use in verifying the hardware and software integrity of equipment or devices for measuring and documenting quantities of environmental interest.

5. The method according to claim 1 for use in verifying the hardware and software integrity of environmental conservation projects by certifying entities.

6. The method according to claim 1 for use in verifying the hardware and software integrity of electronic voting machines.

7. The method according to claim 1 for use in verifying the hardware and software payloads integrity of Space Artifacts.

8. A device for hardware and embedded software authentication comprising physical input and output interfaces for connection to hardware containing embedded software, to be authenticated and a microprocessor configured for:

a) sending one or more signals to the hardware containing embedded software to be authenticated to interrogate it for a uniquely identified record of each hardware and embedded software;

b) receiving back said signals;

c) checking the conformity between the unique record of the hardware and embedded software obtained from the interrogation and the unique record previously identified and stored;

d) sending a signal to a physical and/or digital media to report compliance or non-compliance; and e) conducting a parameterized verification of electromagnetic signature (MVAE) comprising the steps of
i) defining a limit of similarity,
ii) determining when equality use by proximity by at least one of setting distance to amplitude and setting distance to frequency,
iii) obtaining the reading of the electromagnetic signature performed on a supplier's website and storing a reading of the electromagnetic signature performed on a supplier's website in a vector,
iv) obtaining the reading of the electromagnetic signature performed on a user's website and storing the reading of the electromagnetic signature performed on a user's website in a vector,
v) for each point of the electromagnetic signature obtained on the supplier's website:
determining when strict equality is being used by checking if each point of the electromagnetic signature obtained on the supplier's website is equal to a point of a same position in a vector of the electromagnetic signature obtained on the user's website, and if different, incrementing a counter of dissimilar peaks; and
determining when equality by tolerance window is being used by checking if the point of the same position in the vector of the electromagnetic signature obtained at the user's site is within the tolerance window and if different, incrementing the counter of dissimilar peaks;
vi) calculating the percentage of dissimilar peaks by dividing the counter of dissimilar peaks by the size of the vector created to store the electromagnetic signature obtained on the supplier's website; and
vii) if the percentage of different peaks equals zero the signatures are equal, if less than the limit of similarity then the signatures are similar, if greater the signatures are dissimilar.

* * * * *